United States Patent [19]

Ohmika et al.

[11] Patent Number: 5,102,944
[45] Date of Patent: Apr. 7, 1992

[54] AQUEOUS PRIMER COMPOSITION FOR POLYOLEFIN RESINS

[75] Inventors: Hiroyoshi Ohmika, Yokohama; Masahiko Yamanaka, Hadano; Masashi Ohno, Chigasaki, all of Japan

[73] Assignees: Nissan Motor Co., Ltd., Yokohama; Nippon Petrochemicals Co., Ltd., Tokyo, both of Japan

[21] Appl. No.: 515,060

[22] Filed: Apr. 26, 1990

[30] Foreign Application Priority Data

Apr. 28, 1989 [JP] Japan ................................. 1-110976

[51] Int. Cl.⁵ .............................................. C08K 3/02
[52] U.S. Cl. ...................................... 524/501; 524/517
[58] Field of Search ................................ 524/517, 501

[56] References Cited

U.S. PATENT DOCUMENTS

| | | | |
|---|---|---|---|
| 4,174,335 | 11/1979 | Ohdaira et al. | 525/71 |
| 4,299,754 | 11/1981 | Shiomi et al. | 260/33.6 VA |
| 4,692,357 | 9/1987 | Mayumi et al. | 427/393.5 |
| 4,692,483 | 9/1987 | Tsuchiya et al. | 524/517 |
| 4,755,553 | 6/1988 | Kishimura et al. | 524/531 |
| 4,755,553 | 7/1988 | Kishimura et al. | 524/531 |
| 4,775,713 | 10/1988 | Homma et al. | 524/517 |
| 4,874,818 | 10/1989 | Yamamoto et al. | 525/183 |
| 4,883,834 | 11/1989 | Yamamoto et al. | 524/504 |

*Primary Examiner*—Joseph L. Schofer
*Assistant Examiner*—Mark D. Sweet
*Attorney, Agent, or Firm*—Scully, Scott, Murphy & Presser

[57] ABSTRACT

An aqueous primer composition for use in applying to polyolefin resin substrates which is excellent in adhesiveness to polyolefin resin substrates, water resistance and gasoline resistance and which is free from the problems of fire and environments pollution. The primer composition comprises a resin component (a) of 100 parts by weight of modified polyolefin which is prepared by modifying polyolefin with an $\alpha$, $\beta$-unsaturated carboxylic acids and which contains 0.05 to 0.5 equivalent of free carboxylic acid groups per 100 g, with the other resin component (b) of 5 to 500 parts by weight of modified resin having both ethylenically unsaturated double bonds and free carboxylic acid groups, which modified resin is prepared by adding an $\alpha$, $\beta$-unsaturated dicarboxylic anhydride to a drying oil or a conjugated diene polymer or conjugated diene copolymer and then opening the ring of the acid anhydride group; and is prepared by neutralizing at least a part of free carboxylic acid groups of said modified polyolefin of component (a) and/or said modified resin of component (b) with a base and then dissolving or dispersing them in water.

8 Claims, No Drawings

AQUEOUS PRIMER COMPOSITION FOR POLYOLEFIN RESINS

BACKGROUND OF THE INVENTION (1) Field of the Invention

This invention relates to a primer composition, especially to an aqueous primer composition which is applied previously to the application of finish coating on the surfaces of polyolefin resin substrates such as bumpers, side body moldings, instrument panels of automobiles and so forth. The polyolefins includes polyethylene, polypropylene, ethylene-propylene copolymers and the like which have no polar groups.

(2) Description of Prior Art

Because the olefin resin consists of non-polar elements of hydrogen and carbon, when an ordinary paint is directly applied, the adhesiveness of coated film is not good. Accordingly, in the conventional art, the surfaces of molded articles are subjected to chemical treatment or plasma treatment or they are coated by a primer coating mainly comprising polyurethane resin, fatty acid-modified polyester resin, maleic anhydride-grafted product of polypropylene or ethylene-α-olefin copolymer, chlorinated polyolefin, or acid-modified chlorinated polyolefin, and after that, application of finish coating is carried out.

Especially, in the method to apply a modified polyolefin primer mainly comprising grafted polymer of polypropylene or ethylene-α-olefin copolymer with maleic anhydride, chlorinated polyolefin, or acid-modified chlorinated polyolefin, it is characterized in that the application of finish coating can be done without impairing the low temperature shock resistance of the polyolefin resin material.

For this reason, various kinds of primer compositions have been proposed, for example, in U.S. Pat. Nos. 4,299,754; 4,755,553; 4,647,365; 4,692,357; 4,883,834 and 4,874,818.

With regard to the above-mentioned primer compositions, there are problems of flammability and working environment because they are generally used as solutions in organic solvents. Accordingly, if these primer compositions can be used as solutions or dispersions in water, it is very advantageous in view of handling as compared with the solvent types.

It is difficult, however, to use these primer compositions in an aqueous dispersion type or aqueous solution type. Furthermore, even when they can be dispersed in water, such an aqueous primer cannot be practically used because the dispersion of pigment is not good and the application on polyolefin resin is difficult.

Still further, many kinds of water-soluble high polymer compounds and compositions have been hitherto proposed as adhesives and coating materials. However, it is difficult to apply these compositions intact on polyolefin resin. Even when they can be used for coating, the obtained coating film is not satisfactory in the adhesiveness to polyolefin resin, physical properties and water resistance, so that there has been no practically acceptable primer compositions.

For example, emulsions of ethylene polymer and styrene polymer are used for preparing adhesives and coating materials. They are mainly used for goods made of paper, wood or metals, however, any application, especially as a primer, for polyolefin resin has never been proposed.

It is considered that, because the wetting tension of polyolefin resin is generally low, when an aqueous solution or dispersion having a high surface tension is applied to it, any desirable coating film cannot be obtained owing to cratering or other defects.

Furthermore, because these aqueous compositions of the emulsion of ethylene polymer or styrene polymer are usually prepared by using emulsifying agents, the agent remains in the formed coating films on polyolefin substrates, and the agent impairs not only the physical properties of the coating films but also the water resistance of the coating film.

Still further, proposed in U.S. Pat. No. 4,174,335 is a method to prepare aqueous dispersion using a specific modified olefin polymer without any surface active agent. In U.S. Pat. No. 4,775,713 and European Laid-Open Patent No. 183,493, carboxylic acidmodified olefin polymers having specific properties are proposed as auxiliary dispersing agents for aqueous dispersions. However, when the content of the introduced carboxylic acid is small, the dispersibility is not good enough and it is substantially difficult to disperse pigments simultaneously. On the other hand, when the content of the introduced carboxylic acid is too large, the solvent resistance and water resistance of obtained coating film are not satisfactory.

As described above, there are problems of flammability and working environment because the primer compositions for polyolefin resin are generally used as solutions in organic solvents. If these primer compositions can be used as solutions or dispersions in water, it is very convenient in handling as compared with the solvent type compositions.

Many aqueous compositions has been hitherto proposed as adhesives and coating materials. However, when they are applied to polyolefin resin substrates, they are difficultly applied and obtained coating films are not satisfactory.

Furthermore, in the case that a large quantity of surface active agent is added to a primer composition in order to improve the coating property to polyolefin resin substrates, several properties such as water resistance and solvent resistance which are required for the primer coating cannot be made satisfactory.

BRIEF SUMMARY OF THE INVENTION

It is, therefore, the object of the present invention to provide an aqueous primer composition which can be used for applying to polyolefin resin substrates and which can form primer coating films having desirable properties.

In order to solve the above problems, the inventors have carried out extensive investigation and, as a result, an aqueous primer composition having desirable properties and being used for applying to polyolefin resin substrates was invented by formulating a composition of several kinds of resins and thermosetting and reactive surface active agents, thereby accomplishing the present invention. These resins have been used only for organic solvent type primers for coating polyolefin resins.

According to the present invention, the aqueous primer composition for polyolefin resin comprises resin components of:

(a) 100 parts by weight of modified polyolefin which is prepared by modifying polyolefin containing a basic component of propylene with an $\alpha,\beta$-unsaturated carboxylic acids and which contains 0.05 to 0.5 equivalent of free carboxylic acid groups per 100 g. and (b) 5 to 500 parts by weight of modified resin having both ethylenically unsaturated double bonds and free carboxylic acid groups, which modified resin is prepared by adding an α,β-unsaturated dicarboxylic anhydride to a drying oil or a conjugated diene polymer or copolymer having a number average molecular weight of 10,000 or lower and then opening the rings of acid anhydride groups by water and/or alcohol, and at least a part of the free carboxylic acid groups of the modified polyolefin of component (a) and/or the modified resin of component (b) is nuetralized with a base and it is further dissolved or dispersed in water.

DETAILED DESCRIPTION OF THE INVENTION

In the following, the present invention will be described in more detail.

Modified Polyolefin (a)

In the resin component (a) of the present invention, the polyolefin containing a basic component of propylene means the homopolymer and copolymer of propylene, in which modified products such as chlorinated products are included. Viscosity average molecular weights of them are generally in the range of 10,000 to 500,000. The polyolefins containing 30% by weight or more of propylene component are especially preferable. Among them, exemplified as typical materials are polypropylene homopolymer, ethylene-propylene copolymer, ethylene-propylene-diene terpolymer and 10 to 50 wt.% chlorinated polypropylene.

The modified polyolefin as the component (a) in the present invention is obtained by modifying the above polyolefin containing a basic component of propylene with α,β-unsaturated carboxylic acids.

The above α,β-unsaturated carboxylic acids are unsaturated monocarboxylic acids, unsaturated dicarboxylic acids and their anhydrides or their esters. Among them, unsaturated dicarboxylic acids and their anhydrides are preferably used. Exemplified as these unsaturated monocarboxylic acids, unsaturated dicarboxylic acids and their anhydrides are acrylic acid, methacrylic acid, maleic acid, maleic anhydride, citraconic acid, citraconic anhydride, and fumaric acid. The esters of unsaturated carboxylic acids are exemplified by lower alkyl esters of the above unsaturated monocarboxylic acids, and mono-lower alkyl esters and di-lower alkyl esters of the unsaturated dicarboxylic acids. The lower alkyl groups herein referred to are exemplified by methyl group, ethyl group, propyl group, isopropyl group, and butyl group.

For the modification with these α,β-unsaturated carboxylic acids, several known methods can be employed. For example, the foregoing polyolefin containing a basic component of propylene is dissolved in an organic solvent and the α,β-unsaturated carboxylic acids and a radical generating agent are then added with heating and stirring. In another method, the modification is carried out by fusing the above-mentioned polyolefin containing a basic component of propylene and then adding α,β-unsaturated carboxylic acids and a radical generating agent with heating and stirring. In still another method, the modification is carried out in an extruder by feeding polyolefin and other components into the extruder. When the modification is done by dissolving materials in an organic solvent, it is advantageous in that the unreacted α,β-unsaturated carboxylic acid can be removed by using acetone or else. Through the above methods of modification, polyolefin which is modified with α,β-unsaturated carboxylic acids can be obtained.

As described above, there are proposed many primer compositions in which polyolefin containing a basic component of propylene is modified with α,β-unsaturated carboxylic acids, are dissolved in organic solvents. For example, they are described in U.S. Pat. Nos. 4,299,754 and 4,461,809.

Some of these modified polyolefins described in these patent gazettes can be used as the modified polyolefin (a) in the present invention.

However, it should be noted that, when the modified polyolefin is used as a component of the aqueous primer composition of the present invention, it is necessary that 0.05 to 0.5 equivalent of free carboxylic acid group is contained per 100 g of the modified polyolefin. For this reason, if necessary, the modified polyolefin must be modified further.

When the modification is carried out with an unsaturated monocarboxylic acid or unsaturated dicarboxylic acid or a mono-lower alkyl ester of unsaturated dicarboxylic acid, the modified polyolefin (a) having 0.05 to 0.5 equivalent of free carboxylic acid group per 100 g of the modified polyolefin can be obtained without any additional modification.

When the modification is carried out with a lower alkyl ester of unsaturated monocarboxylic acid or di-lower alkyl ester of unsaturated dicarboxylic acid having none of free carboxylic acid group, it is possible to prepare the modified polyolefin (a) having 0.05 to 0.5 equivalent of free carboxylic acid group per 100 g of the modified polyolefin by hydrolyzing the added ester through an ordinary method. The hydrolysis of the ester can be carried out simultaneously with the process to neutralize with a base and to disperse in water, which process will be described later.

Furthermore, when the modification is carried out with an unsaturated dicarboxylic anhydride, the modified polyolefin (a) having 0.05 to 0.5 equivalent of free carboxylic acid group per 100 g of modified polyolefin can be obtained by subjecting the added acid anhydride group to ring cleavage by using water, alcohols or amines.

As the alcohols used for the ring cleavage of acid anhydride are exemplified by aliphatic monoalcohols such as methanol, ethanol, propanol, isopropanol, and butanol; aliphatic polyalcohols such as ethylene glycol, diethylene glycol, propylene glycol, butanediol, hexanediol, trimethylol propane, and pentaerythritol; ether alcohols such as propylene glycol monomethyl ether, ethylene glycol monomethyl ether, ethylene glycol monoethyl ether, ethylene glycol monoisopropyl ether, ethylene glycol monobutyl ether, diethylene glycol monomethyl ether, and 3-methoxybutanol; hydroxyl group-containing acrylic esters such as 2-hydroxyethyl acrylate and 2-hydroxyethyl methacrylate; aminoalcohols such as dimethylaminoethanol and dimethylaminopropanol; and phenol and cresol.

As the amines used for the ring cleavage of acid anhydride are exemplified by aliphatic primary amines such as monomethylamine, monoethylamine, monopropylamine, monobutylamine, monohexylamine, and monooctylamine; primary alkanol amines such as monoethanolamine and monopropanolamine; aliphatic secondary amines such as dimethylamine, diethylamine, dibutylamine, and dioctylamine; and secondary alkanol amines such as diethanolamine and dipropanolamine.

The above acid anhydride group and alcohols or amines easily form ester bonds or amide bonds at temperatures of 0° to 120° C. through a conventionally known method to open the rings. When alcohols are used, it is desirable to use a base as a catalyst because the reaction can be carried out at lower temperatures.

The above reaction can be done either using a solvent or without using any solvent. When solvents are used, aromatic hydrocarbons such as benzene, toluene, xylene and decalin and the foregoing alcohols are desirably employed.

Through the above-described method, the modified polyolefin (a) containing a basic component of propylene and having free carboxylic acid group, which is modified with $\alpha,\beta$-unsaturated carboxylic acid, can be obtained.

The ratio of this free carboxylic acid group is in the range of 0.05 to 0.5 equivalent, preferably 0.075 to 0.15 equivalent, per 100 g of the modified polyolefin. When the quantity of free carboxylic acid group is smaller than 0.05 equivalent, the water dispersibility for an aqueous primer composition and paintability to substrates are not satisfactory. On the other hand, if the quantity is larger than 0.5 equivalent, the properties such as water resistance of obtained coating film is not good.

Modified Resin (b)

The drying oil and conjugated diene polymer or conjugated diene copolymer used for the modified resin (b) of the present invention, form the main chain portion of the modified resin. The drying oils (including semi-drying oils) are exemplified by linseed oil, soybean oil, sesame oil. safflower oil, hempseed oil, cotton seed oil, tung oil, dehydrated castor oil, poppy seed oil, perilla oil, corn oil, tall oil, sunflower oil, walnut oil, rubberseed oil, rice bran oil, high diene oil, and their thermally polymerized oils. These oils can be used either singly or in combination of two or more kinds.

The conjugated diene polymers and conjugated diene copolymers are exemplified by lower polymers of conjugated dienes such as butadiene and isoprene having 4 to 5 carbon atoms, and other lower copolymers of one or more of these conjugated dienes with other monomers of aliphatic or aromatic vinyl monomers having ethylenically unsaturated bonds besides the above conjugated dienes, such as isobutylene, diisobutylene, styrene, $\alpha$-methylstyrene, vinyltoluene, and divinylbenzene. Furthermore, the conjugated diene polymers or copolymers which are partially modified with oxygen-containing compounds or nitrogen-containing compounds or those in which carboxylic acid groups are added to terminals of molecular chains, can also be used. The above materials can be used either singly or in a mixture of two or more.

Furthermore, it is also possible to use the mixture of two kinds or more of these drying oils, conjugated diene polymers and conjugated diene copolymers.

It is desirable for the drying oils, conjugated diene polymers and conjugated diene copolymers used in the present invention that they have an iodine value of 80 or higher, but preferably lower than 500, and a number average molecular weight of 10,000 or less, but preferably more than 500. If the iodine value is lower than 80, for example, it is difficult to introduce $\alpha,\beta$-unsaturated dicarboxylic anhydrides as much as required for the dispersion in water in the succeeding process. If the number average molecular weight is higher than 10,000, the improvement in water dispersibility is difficult which results in the lowering of storage stability of obtainable primer compositions. In addition, there is another problem in that the smoothness of obtained coating film is impaired.

Especially preferable conjugated diene polymers and conjugated diene copolymers are butadiene polymers or copolymers which contain, at least, 50 mol % or more of butadiene.

Furthermore, in the present invention, the modified resin (b) has free carboxylic acid groups on its main chain or side chain. In the modified resin (b), these free acid groups are neutralized by a base, at least partially, and it is added to the primer composition in order to improve the dispersibility or solubility to water of the above-described modified polyolefin (a). Accordingly, the necessary quantity of free acid groups is 0.05 to 0.5 equivalent per 100 g of the modified resin. If the quantity is less than 0.05 equivalent, the affinity to water cannot be obtained. Meanwhile, if the quantity is more than 0.5 equivalent, the water resistance of obtained coating film is impaired. So that, these are not desirable.

As a method to introduce the free carboxylic acid groups to main chains or side chains, conventionally known methods can be employed. For example, in order to introduce the free carboxylic acid groups, an $\alpha,\beta$-unsaturated dicarboxylic acid such as maleic acid or its anhydride is added to the reaction material.

In the present invention, in view of the fact that the affinity to water is improved by the introduced free carboxylic acid, and it is convenient for the next modification process, $\alpha,\beta$-unsaturated dicarboxylic anhydrides are added to drying oils or conjugated diene polymers or conjugated diene copolymers.

The $\alpha,\beta$-unsaturated dicarboxylic anhydrides to be added to drying oils, conjugated diene polymers and conjugated diene copolymers are typically exemplified by maleic anhydride, ctraconic anhydride, and chloromaleic anhydride.

This addition reaction is usually done at temperatures of 100° C. to 250° C. in an inert solvent. In this reaction, it is advisable that 0.1 to 0.2% by weight of hydroquinone, catechols or diphenylamine derivatives are added as gelation inhibitors.

The addition quantity of these $\alpha,\beta$-unsaturated dicarboxylic anhydrides is so determined as to make the quantity of free carboxylic acid 0.05 to 0.5 equivalent, preferably 0.1 to 0.3 equivalent, per 100 g of modified resin.

Furthermore, the modified resin (b) of the present invention is used in a form that it contains free carboxylic acid groups which is prepared by opening the rings of introduced acid anhydride groups using water or alcohols. The alcohols are the same as those used in the ring-cleavage of acid anhydride groups in the foregoing preparation of modified polyolefin (a). The reaction is also carried out under similar conditions.

AQUEOUS DISPERSION

In the present invention, the aqueous primer composition is prepared by neutralizing a composition comprising indispensable components of the foregoing modified polyolefin (a) and modified resin (b) by using a base and the resultant product is then dispersed or dissolved in water.

In the preparation of an aqueous primer composition, any one or both of these resin components are neutralized and then they are mixed together, or these resin components are previously mixed and then neutralized with a base to be dispersed or dissolved in water. Any of these methods can be employed.

In another method, it is also desirably carried out that a base is previously dissolved in water and the resin components are added thereto to carry out neutralization and water dispersion simultaneously.

In order to disperse or dissolve in water the above two kinds of resin components, the necessary quantity of the base is the amount that at least a part of, preferably more than 20 mol % of total free carboxylic acid groups in both components (a) and (b), is neutralized. If the quantity of base is smaller than the above amount, the water dispersibility or solubility is not good and the aqueous primer composition cannot be used practically.

The bases used for the neutralization are exemplified by ammonia, amines, and hydroxides, carbonates and bicarbonates of alkali metals. Usable amines are primary, secondary and tertiary amines such as diethylamine and triethylamine; primary, secondary and tertiary alkanolamines or cycloamines such as monoethanlamine, diethanolamine, triethanolamine, and N,N-dimethylethanolamine; aromatic amines such as N,N-dimethylbenzylamine. Usable hydroxides of alkali metals are sodium hydroxide and potassium hydroxide. Usable carbonates and bicarbonates are sodium carbonate and sodium bicarbonate. Among these bases, triethylamine is preferable.

In order to facilitate the neutralization and water-dispersion, if need be, it is possible to add several organic solvents to water. Such organic solvents are exemplified by ether-alcohol solvents such as ethyl cellosolve and butyl cellosolve; glyme or diglyme solvents such as ethylene glycol dimethyl ether; and other watersoluble organic solvents such as diacetone alcohol, 4-methoxy-4-methylpentanone-2, and methyl ethyl ketone. Water-insoluble organic solvents are exemplified by aromatic hydrocarbons such as xylene, toluene, and decalin; as well as methyl isobutyl ketone and 2-ethylhexanol.

COMPONENTS TO BE MIXED

The modified polyolefin (a) of the present invention is a component of primer composition which is excellent in adhesiveness to substrates of olefin resin. When it is used intact as a component for preparing an aqueous primer composition, there is a problem in that it is separated during storage or addition of pigments is difficult because the water dispersibility is not good.

Meanwhile, the modified resin (b) of the present invention is known as a resin used for aqueous paints, especially anionic electrodeposition coating material. The material which is prepared by neutralizing the resin has excellent water dispersibility and pigment dispersibility. However, the resin itself is not good in the adhesiveness to olefin resin substrates, so that it has never been used for aqueous primer compositions.

Accordingly, the aqueous primer composition of the present invention is prepared by mixing the above-mentioned components in certain ratios. That is, 100 parts by weight of the modified polyolefin (a) is mixed with 5 to 500 parts by weight, preferably 10 to 200 parts by weight, of the modified resin (b).

If the mixing ratio of the modified resin (b) is lower than this range, the water dispersibility and storage stability of aqueous primer is not satisfactory. On the other hand, if the mixing ratio exceeds this range, the adhesiveness to polyolefin resin substrates and low temperature shock resistance are impaired.

Various methods can be employed for mixing resin components without any limitation. For example, resin components are mixed together by using a roll, kneader or Bumbury's mixer; resin components are dissolved in suitable solvents and then mixed with stirring; or each resin component is previously neutralized with a base and dispersed in water and they are then mixed with stirring. Especially, when pigments or other materials are mixed, it is desirable that pigments are dispersed in an aqueous solution of modified resin (b) and it is then mixed with the modified polyolefin (a).

For the composition of the present invention, any suitable organic solvent, especially water-soluble solvent, can be used within the purpose of the present invention.

The composition of the present invention can be used with adding various pigments and additives. The pigments are exemplified by coloring pigments such as titania, iron oxide red, carbon black; body pigments such as aluminum silicate and precipitated barium carbonate; and rust inhibitive pigments such as strontium chromate and basic lead silicate. Furthermore, known emulsifying agents and antioxidants can also be used. The quantity of pigment used in the present invention is 0 to 150 parts by weight, preferably 20 to 50 parts by weight, per 100 parts by weight of the composition.

Even though it depends upon the method of applying and the viscosity of primer composition, the concentration of solid contents as the sum of modified polyolefin (a) and modified resin (b) is 1 to 20% by weight, preferably 2 to 10% by weight.

A layer of primer can be formed on a polyolefin resin substrate by applying the primer composition of the present invention to the substrate by a conventionally known method such as spraying or brushing, and if necessary, the applied coating is dried.

As described above, the primer composition of the present invention can be applied to polyolefin resin substrates and the obtained primer coating is excellent in adhesiveness to the polyolefin resin substrate, water resistance and gasoline resistance. Because this primer composition is an aqueous composition, it has advantages in that it is free from the problems to catch fire and to cause environmental pollution.

In the following, the aqueous primer composition of the present invention will be described in more detail with reference to several examples.

PREPARATION EXAMPLE 1

Preparation of Resin Component (a1)

To a 15 liter stainless steel reaction vessel equipped with a stirrer and a thermometer, were added 4 liter of toluene and 1000 g of propylene-ethylene copolymer (made by Japan Synthetic Rubber Corp., trademark: P2167, $[\eta]=1.3$, content of propylene: 65%). After replacing atmosphere with nitrogen, the temperature was raised to 145° C. to dissolve the copolymer completely with stirring. A solution of 250 g of maleic anhydride in 2.5 liter of toluene and another solution of 58 g of di-tert-butyl peroxide in 600 ml of toluene were dropped into the reaction vessel over 4 hours through separate inlet ports with stirring. After the dropping, reaction was continued for further 2 hours at 145° C.

After cooling the reaction system to room temperature, a part of reaction mixture was poured into a large volume of acetone to obtain precipitate of copolymer which was modified with maleic anhydride. After washing this precipitate with acetone repeatedly, it was dried at 60° C. for 5 hours in vacuum to obtain propylene-ethylene copolymer modified with maleic anhydride. The maleic anhydride graft quantity of this product was 9.2 wt.% and the intrinsic viscosity was 0.7.

The graft quantity of maleic anhydride was determined by infrared absorption spectrum and the intrinsic viscosity was determined at 135° C. in tetralin.

To a 1 liter autoclave were added 100 g of this maleic anhydride modified propylene-ethylene copolymer, 34.8 g of n-butanol, 142.6 g of ethylene glycol monobutyl ether, and 8.6 g of triethylamine. The contents were allowed to react at 150° C. for 5 hours to obtain a composition (a1) containing thermoplastic resin having carboxylic acid groups, which was the component (a) of the present invention.

The non-volatile matter of this composition (a1) was 37.4% and the acid value was 18.4 mg KOH/g.

PREPARATION EXAMPLE 2

Preparation of Resin Component (a2)

To a 1 liter autoclave were added 100 g of maleic anhydride modified propylene-ethylene copolymer which was prepared in Preparation Example 1, 17 g of deionized water, 135.6 g of diacetone alcohol, and 17.1 g of triethylamine. The contents were allowed to react at 150° C. for 5 hours to obtain a composition (a2) containing thermoplastic resin having carboxylic acid groups, which was the component (a) of the present invention.

The non-volatile matter of this composition (a2) was 37.7% and the acid value was 39 mg KOH/g.

PREPARATION EXAMPLE 3

Preparation of Resin Component (a3)

To a 15 liter stainless steel reaction vessel equipped with a stirrer and a thermometer, were added 4 liter of toluene and 1000 g of propylene-ethylene copolymer (made by Japan Synthetic Rubber Corp., trademark: EP921, [η]=1.2, content of propylene: 50%). After replacing atmosphere with nitrogen, the temperature was raised to 145° C. to dissolve the copolymer completely with stirring. A solution of 250 g of maleic anhydride in 2.5 liter of toluene and another solution of 58 g of di-tert-butyl peroxide in 600 ml of toluene were dropped into the reaction vessel over 4 hours through separate inlet ports with stirring. After the dropping, reaction was continued for further 2 hours at 145° C.

After cooling the reaction system to room temperature, a part of reaction mixture was poured into a large volume of acetone to obtain precipitate of copolymer which was modified with maleic anhydride. After washing this precipitate with acetone repeatedly, it was dried at 60° C. for 5 hours in vacuum to obtain propylene-ethylene copolymer modified with maleic anhydride. The maleic anhydride graft quantity of this product was 8.3 wt.% and the intrinsic viscosity was 1.5.

To a 1 liter autoclave were added 100 g of this maleic anhydride modified propylene-ethylene copolymer, 31.4 g of n-butanol, 372 g of ethylene glycol monobutyl ether, and 7.7 g of triethylamine. The contents were allowed to react at 150° C. for 5 hours to obtain a composition (a3) containing thermoplastic resin having carboxylic acid groups, which was the component (a) of the present invention.

The non-volatile matter of this composition (a3) was 20.8% and the acid value was 9.3 mg KOH/g.

PREPARATION EXAMPLE 4

Preparation of Resin Component (b)

To a 3 liter separable flask were added 2000 g of Nisseki Polybutadiene B-1000 (made by Nippon Petrochemicals Co., Ltd., Number average molecular weight: 1000, Vinyl: 65%, Trans: 14%, Cis: 16%), 326 g of maleic anhydride, 4 g of Antigen 6C (made by Sumitomo Chemical Co., Ltd., N-methyl-N'-(1,3-dimethylbutyl)-p-phenylenediamine) and 20 g of xylene. The contents were allowed to react at 195° C. for 5 hours in a stream of nitrogen. The unreacted maleic anhydride was distilled off under a reduced pressure to obtain maleic liquid polybutadiene of 80 mg KOH/g in half acid value.

To a separable flask with a cooling tube were added 500 g of the obtained maleic liquid polybutadiene, 93 g of 2-hydroxyethyl methacrylate and 2.2 g of cobalt acetylacetonato (cobalt content: 22.9%) and they were heated to 80° C. for 2 hours in a stream of nitrogen. After that, 475 g of ethylene glycol monobutyl ether was added and stirred for 1 hour to obtain a modified resin (b) containing acid groups. The acid value of this product was 37.5 mg KOH/g and the non-volatile matter was 55%.

EXAMPLES 1 TO 4

In every example, the preparation of primer composition, application of the composition to test plates and evaluation of properties were carried out as follows.

The quantities of components of compositions, properties of compositions and obtained property test results are shown in the following Table 1.

(A) PREPARATION OF PRIMER COMPOSITION (1) Preparation of Aqueous Dispersion of Resin Component (a)

The compositions of polyolefin modified with maleic anhydride prepared in Preparation Examples 1 to 3 were heated to 80° C. and necessary quantities of deionized water were added gradually with stirring and the stirring was continued for further 4 hours at 80 to 90° C. to prepare the aqueous dispersion of resin component (a). The acid equivalents (mmol/100 g solid) and non-volatile matters (%) of these aqueous dispersions are shown in Table 1.

(2) Preparation of
Aqueous Dispersion of Resin Component (b)

To a 2 liter separable flask were added 650 g of the modified resin having acid groups obtained in Preparation Example 4, 290 g of ethylene glycol monobutyl ether and 33 g of triethylamine and the contents were stirred sufficiently. Then 482 g of deionized water was added to obtain an aqueous dispersion of resin component (b). The non-volatile matter in this aqueous dispersion was 25%.

(3) Preparation of Primer Composition

Carbon black (trademark: Carbon Black #3250, made by Mitsubishi Chemical Industries Ltd.) was added to the aqueous dispersion of the resin component (b) prepared in the above example and it was dispersed for 2 hours at 3000 rpm using a high speed stirrer with glass beads. The aqueous dispersion of the resin component (a) was further added and it was dispersed for 2 hours at 2000 rpm. After that, water-soluble solvent and deionized water were added and the mixture was filtered through a wire gauze of 400 mesh to obtain a final primer composition. The quantity (g) of each composition is shown in Table 1.

(B) DISPERSION STABILITY OF COATING MATERIAL

A part of the obtained primer composition was put into a glass bottle and it was left to stand still for 1 week at ordinary temperature (25° C. to 30° C). When the separation of resin composition or carbon black was not observed, an evaluation of "pass" was given.

(C) METHOD FOR COATING

Surfaces of test plates (made by Nippon Petrochemicals Co., Ltd., soft bumper grade XNB-2011 of polypropylene) of 150×150×3 mm in sizes were washed with the vapor of 1,1,1-trichloroethane. The above primer composition was applied to the test plates by air spraying method and they were dried at 120° C. for 30 minutes.

Urethane paint (trademark: Flexene #101, made by Nippon Bee Chemical Co., Ltd.) was further applied to the test plates by spraying and they were dried at 120° C. for 30 minutes.

(D) EVALUATION OF COATING FILM

The following tests were carried out with regard to the coating films (1CB) which were prepared by coating with a primer composition and then drying at 120° C. for 30 minutes and other coating films (2CB) which were prepared by applying a further coating of urethane paint and then drying at 120° C. for 30 minutes. The results of the tests are shown in Table 1.

(1) Measurement of Thickness of Coating

When the primer compositions and urethane paints were sprayed, steel plates of 150×70×6 mm which were treated with zinc phosphate were simultaneously coated and dried likewise. The thicknesses of coating films on the steel plates were measured by an electromagnetic film thickness meter (made by Sunforum Industries Co., Ltd.) and the resultant values were regarded as the thickness of coatings on test plates.

(2) Appearance of Coating Film

In connection with the test plates which were applied with only primer composition, the formation of defects in coating films such as cratering, blistering and pinholes were confirmed with the naked eye. The standards for evaluation were as follows:

○: Sufficiently smooth without any defect in coating film.
Δ: No defect in coating film but insufficient smoothness.
X: Defects of cratering and pinholes were observed.

(3) Adhesiveness Test

The adhesiveness test was carried out according to JIS K 5400, Cross-cut test. Test plates were coated with a primer and urethane paint and dried. Using a cutter knife, 100 of squares were formed by cross-cuts reaching to the substrate at intervals of 1 mm. Adhesive tape was stuck onto the squares and peeled off rapidly. The number of remaining squares was counted and expressed as follows:

⊙: Number of remained squares = 100
○: Number of remained squares = less than 100 but not less than 80
Δ: Number of remained squares = less than 80 but not less than 60
X: Number of remained squares = less than 60

(4) Water Resistance Test

Coated test plates were immersed in pure water at 40° C. for 240 hours. After that, the above adhesiveness test was carried out and results were indicated likewise.

(5) Gasoline Resistance Test

Coated test plates were immersed in regular gasoline at ordinary temperature (20° C.) for 30 minutes and they were taken out and left to stand for 24 hours. Then the cross-cut and tape peeling test was carried out. In the test plates marked as "Pass", no change of coating film was observed after the immersion in gasoline and none of cross-cut was peeled off in tape peeling test.

COMPARATIVE EXAMPLES 1 TO 3

In order to obtain primer compositions dispersing carbon black, preparation was carried out in the like manner as in Examples 1, 3 and 4 except that only the resin composition (a) of the present invention was used singly without using the resin composition (b). In any composition, the storage stability was not good and the composition could not used for the succeeding tests.

COMPARATIVE EXAMPLE 4

To a 2 liter separable flask were added 650 g of the modified resin having acid groups obtained in Preparation Example 4, 290 g of ethylene glycol monobutyl ether and 33 g of triethylamine and stirred sufficiently. Then, by adding deionized water, an aqueous dispersion of resin component (b) was obtained. Carbon black (Electroconductive Carbon Black #3250, made by Mitsubishi Chemical Industries Ltd.) was added to the aqueous dispersion of this resin component (b) and it was dispersed for 2 hours at 3000 rpm using a high speed stirrer with glass beads. After that, watersoluble solvent and deionized water were added and the mixture was filtered through a wire gauze of 400 mesh to obtain a primer composition.

This primer composition was prepared by using only the resin composition (b), by removing the resin composition (a) from the composition in Example 1.

With regard to the thus prepared composition, the application to test plates and property tests were also carried out in the like manner as the foregoing examples.

The properties of composition and obtained test results are also shown in Table 1.

TABLE 1

| Example | Ex. 1 | | Ex. 2 | | Ex. 3 | | Ex. 4 | | Comp. Ex. 4 | |
| --- | --- | --- | --- | --- | --- | --- | --- | --- | --- | --- |
| Aqueous Dispersion of Resin Component (a) | | | | | | | | | | |
| Resin | a1 | | a1 | | a2 | | a3 | | none | |
| Non-volatile | 15 | | 15 | | 15 | | 10 | | — | |
| Acid Equivalent | 79 | | 79 | | 169 | | 72 | | — | |
| Content (g) | 100 | | 100 | | 100 | | 150 | | — | |
| Aqueous Dispersion of Resin Component (b) | | | | | | | | | | |
| Content (g) | 12 | | 24 | | 12 | | 12 | | 72 | |
| Non-volatile | 25 | | 25 | | 25 | | 25 | | 25 | |
| Carbon Black (#3250) Content (g) | 3 | | 3 | | 3 | | 3 | | 3 | |
| Water-Soluble Solvent (Ethylene glycol monobutyl ether) Content (g) | 62 | | 59 | | 62 | | 7.5 | | 60 | |
| Deionized Water Content (g) | 243 | | 234 | | 243 | | 248 | | 237 | |
| Property of Primer Non-volatile | 5.0 | | 5.7 | | 5.0 | | 5.0 | | 5.6 | |
| Tested Coating Film Properties | 1CB | 2CB | 1CB | 2CB | 1CB | 2CB | 1CB | 2CB | 1CB | 2CB |
| Thickness (μ) | 10 | 50 | 10 | 45 | 10 | 50 | 10 | 50 | 10 | 50 |
| Appearance | ○ | ○ | ○ | ○ | △ | △ | ○ | ○ | △ | △ |
| Adhesiveness | ⊚ | ⊚ | ⊚ | ⊚ | ⊚ | ⊚ | ⊚ | ⊚ | △ | △ |
| Water Resistance | ○ | ○ | △ | △ | ○ | ○ | ○ | ○ | X | X |
| Gasoline Resistance | — | Pass | — | Pass | — | Pass | — | Pass | — | Fail |

What is claimed is:

1. An aqueous primer composition for polyolefin resin substrates comprising:
   (a) 100 parts by weight of a modified polyolefin prepared by modifying a polyolefin containing a basic component of propylene with an α,β-unsaturated carboxylic acid which contains 0.05 to 0.5 equivalent of free carboxylic groups per 100 g, and
   (b) 5 to 500 parts by weight per 100 parts by weight of sad modified polyolefin of a modified resin having both ethylenically unsaturated double bonds and free carboxylic acid groups, said modified resin prepared by adding an α,β-unsaturated dicarboxylic anhydride to a drying oil or a conjugated diene polymer or copolymer having a number average molecular weight of 10,000 or less and then opening the ring of said acid anhydride groups by water and/or alcohol,
   said primer composition prepared by neutralizing at least a fraction of said free carboxylic acid groups of the modified polyolefin of component (a) and/or the modified resin of component (b) with a base and then dissolving or dispersing the mixture in water.

2. The aqueous primer composition for polyolefin resin substrates in claim 1, wherein said polyolefin of component (a) is a random copolymer of ethylene and propylene and the content of propylene is 30% by weight or more.

3. The aqueous primer composition for polyolefin resin substrates in claim 1, wherein the addition quantity of said α,β-unsaturated dicarboxylic anhydride to said component (b) is 0.05 to 0.5 equivalent per 100 g of said drying oil or said conjugated diene polymer or conjugated diene copolymer.

4. The aqueous primer composition for polyolefin resin substrates in claim 1, wherein said α,β-unsaturated carboxylic acid is an α,β-unsaturated dicarboxylic acid.

5. The aqueous primer composition for polyolefin resin substrates in claim 4, wherein said α,β-unsaturated dicarboxylic acid is maleic acid.

6. The aqueous primer composition for polyolefin resin substrates in claim 1, wherein said α,β-unsaturated dicarboxylic acid anhydride is maleic acid anhydride.

7. The aqueous primer composition for polyolefin resin substrates in claim 1, wherein said conjugated diene is butadiene.

8. The aqueous primer composition for polyolefin resin substrates in claim 1, wherein a polyolefin of said substrate is selected from the group consisting of polyethylene, polypropylene, ethylene-propylene copolymer and a mixture thereof.

* * * * *